US00RE39444E

(19) United States
(12) Reissued Patent
Rene et al.

(10) Patent Number: US RE39,444 E
(45) Date of Reissued Patent: Dec. 26, 2006

(54) COLLAPSIBLE CONTAINER

(76) Inventors: Svein Rene, Lilleveien 2, N-3124, Tonsberg (NO); Christoffer Worsoe, Hasselbakkveien 2, N-7053, Ranheim (NO)

(21) Appl. No.: 10/273,025

(22) Filed: Oct. 17, 2002

Related U.S. Patent Documents

Reissue of:
(64) Patent No.: 6,164,476
Issued: Dec. 26, 2000
Appl. No.: 09/418,364
Filed: Oct. 14, 1999

(30) Foreign Application Priority Data

May 3, 1999 (NO) ..... 19992127

(51) Int. Cl.
*B65D 6/24* (2006.01)

(52) U.S. Cl. ..... 220/4.31; 220/4.28; 220/485; 220/486; 220/529; 220/1.5

(58) Field of Classification Search ..... 220/1.5, 220/4.28, 4.31, 485, 486, 489, 529, 533, 220/6, 7, 495; 206/386, 600; 312/265.1, 265.2, 312/265.3, 265.4; 211/189, 191
See application file for complete search history.

(56) References Cited

U.S. PATENT DOCUMENTS 2,579,655 A * 12/1951 Donald ..... 220/6
3,069,002 A * 12/1962 Hart ..... 211/46
3,178,245 A * 4/1965 Morioka et al. ..... 312/265.3
3,794,281 A * 2/1974 Munsey ..... 248/188
3,883,026 A * 5/1975 Selz ..... 220/6
4,079,678 A * 3/1978 Champagne ..... 108/110
4,324,172 A * 4/1982 Cazals et al. ..... 99/277.1
4,394,924 A * 7/1983 Zaccheroni ..... 220/486
4,662,532 A * 5/1987 Anderson et al. ..... 220/7
4,776,477 A * 10/1988 Walker ..... 220/4.28
5,063,715 A * 11/1991 Goodman ..... 52/36.6
5,201,414 A * 4/1993 Kaszubinski ..... 206/308.1
5,427,222 A * 6/1995 Miura et al. ..... 198/345.3
5,595,305 A * 1/1997 Hart ..... 206/600

FOREIGN PATENT DOCUMENTS

GB 810907 * 3/1959
GB 2163639 A * 3/1986

* cited by examiner

*Primary Examiner*—Stephen Castellano
(74) *Attorney, Agent, or Firm*—Schnader Harrison Segal & Lewis, LLP

(57) ABSTRACT

Collapsible container comprising a bottom element (11) with openings (21) at the corners for disengagable attachment of two opposite gable walls (12, 13). The gable walls are connected to or are associated with supporting pillars (24) which are provided with slit shaped openings (31) for disengagable mounting of longitudinally arranged sidewall elements (14, 15) which have projecting hooks (28, 29) with notches (30) for engagement with the slit-shaped openings. Openings (39–44) are arranged in the bottom element (11) for disengagable attachment of a transversal partition wall (36). The sidewall elements (14, 15) each have a height dimension (A) which is one half of the width of the bottom element (11). The distance (B) between two sidewall elements (14, 15) is less than the depth of the notch (30) in the hooks (28, 29). The corner posts (22) of the gable walls (12, 13) are manufactured with a tubular profile with attachment slit openings (31) facing inwards, for attachment of shelves (33). The collapsible container also includes supporting pillars or side posts (16, 17) with a projecting flange in both sideward directions, these flanges being provided with slit-shaped openings (42) for attachment of shelves (33).

20 Claims, 3 Drawing Sheets

Exhibit B

Figure 5:
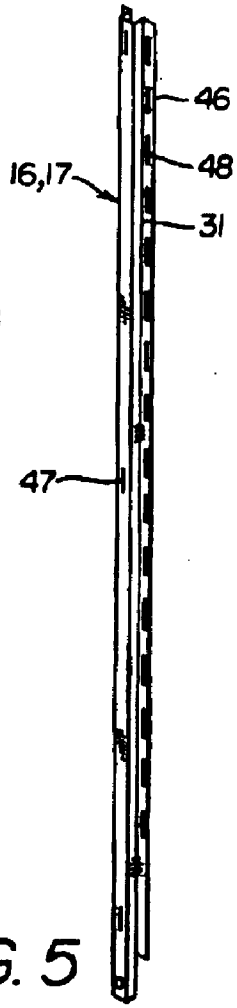

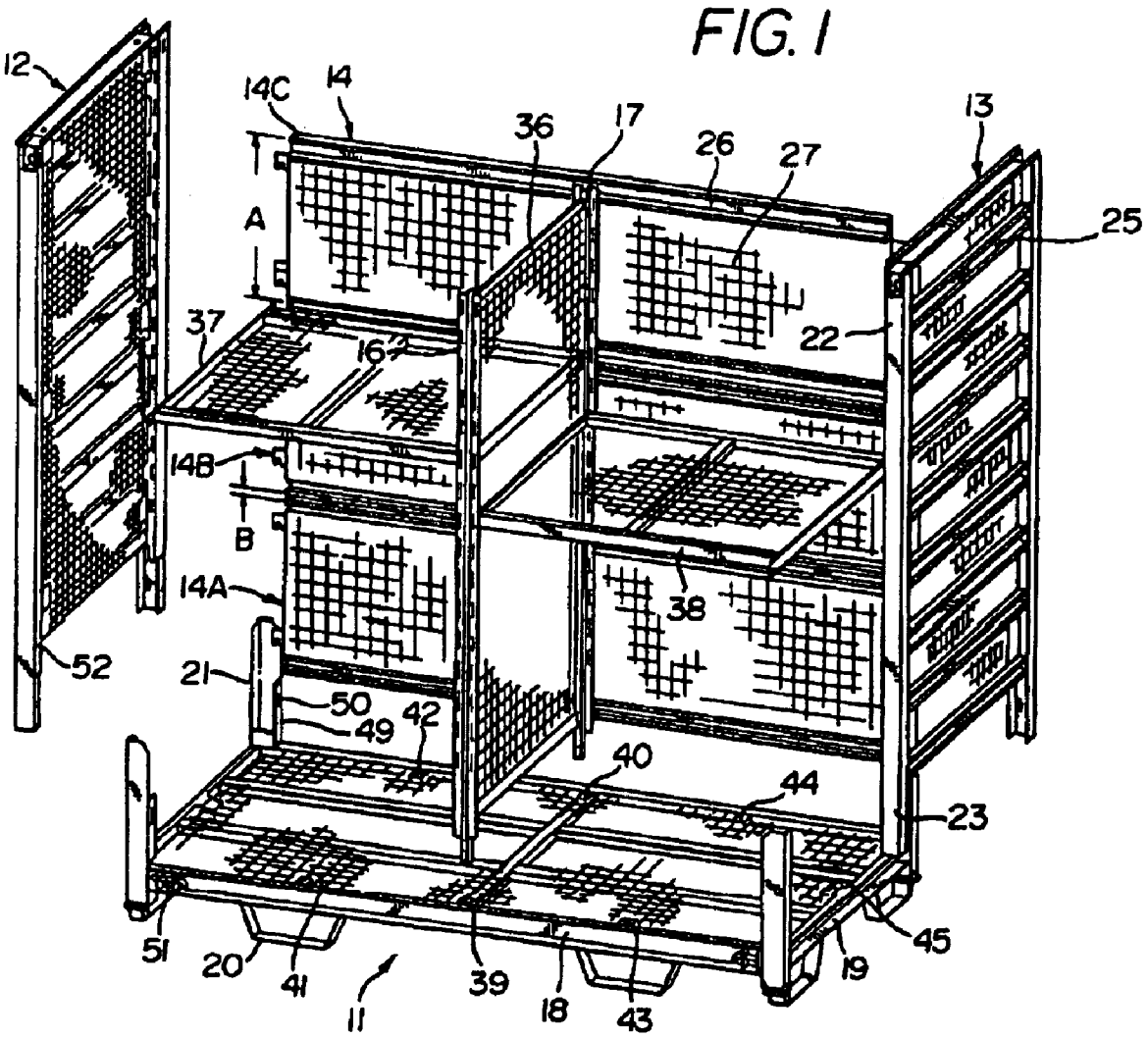
Exhibit B

COLLAPSIBLE CONTAINER

Matter enclosed in heavy brackets [ ] appears in the original patent but forms no part of this reissue specification; matter printed in italics indicates the additions made by reissue.

The present invention relates to a collapsible container as described in the introductory part of claim 1.

BACKGROUND

Many embodiments of collapsible type containers are known. The objective of foldable containers is to reduce the volume for storage and returned empties. At the same time, the requirements for strength and the ability to withstand impact is still high. For containers to be used for transport purposes under difficult conditions (e.g. on bumpy roads, for air freight transportation, or as loads hanging under helicopters), the strength requirements are especially high. This has led to the need for a new type of container which combines high strength and reduced space demand. Part of the required improvement can be obtained through use of higher quaity materials. In addition it is necessary to find better solutions with respect to design.

OBJECTIVE

The main objective of the present invention is to provide an improved collapsible container, which takes little space and at the same time is able to be built with high strength. It is a particular objective to provide a container which is as versatile as possible with regard to its partitioning and assembly. Furthermore the container needs to be capable of being divided into several compartments with shelves and partition walls. In addition it must be lockable to prevent axcess by unauthorised persons.

THE INVENTION

In a broad aspect of the invention there is provided a collapsible container as outlined in the introductory part of claim 1 wherein the side wall elements have a height which is one half of the width of the bottom element, whereas the distance between two side wall elements is less than the depth of the notches in the attachment hook elements, the corner posts of the gable walls being manufactured as tubular profiles with attachment slit openings facing inwards, for the attachment of shelves, while the supporting pillars or side posts are provided with an outwards projecting flange in both sideward directions, which flange is being furnished with slit-shaped openings for the attachment of the shelves.

This combination of elements provides a container with several advantages over known containers. It requires little space for storage and transportation when empty. It prevents unwanted removal of the side wall elements as the different parts are mutually locked. It provides good versatility with respect to partitioning with partition walls and attachment of shelves. In a combination with use of high quality steel, it provides a container which is very stable and able to resist various types of strain, e.g during air freight transportation and as a load carried underneath a helicopter.

Further beneficial features are defined by the dependent claims 2–8.

Figure 4:
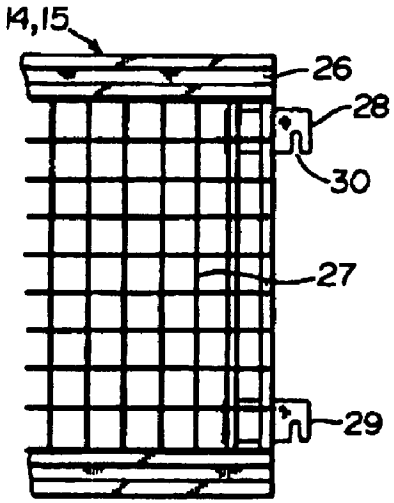
Figure 3:
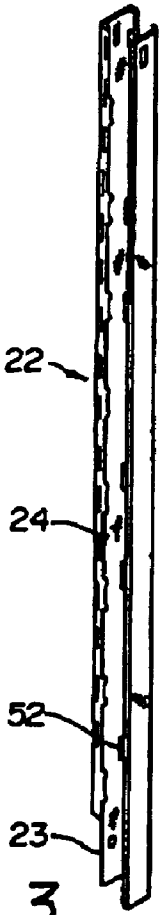
Figure 2:
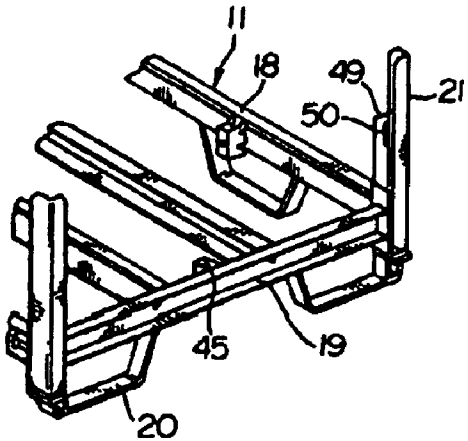
Figure 6:
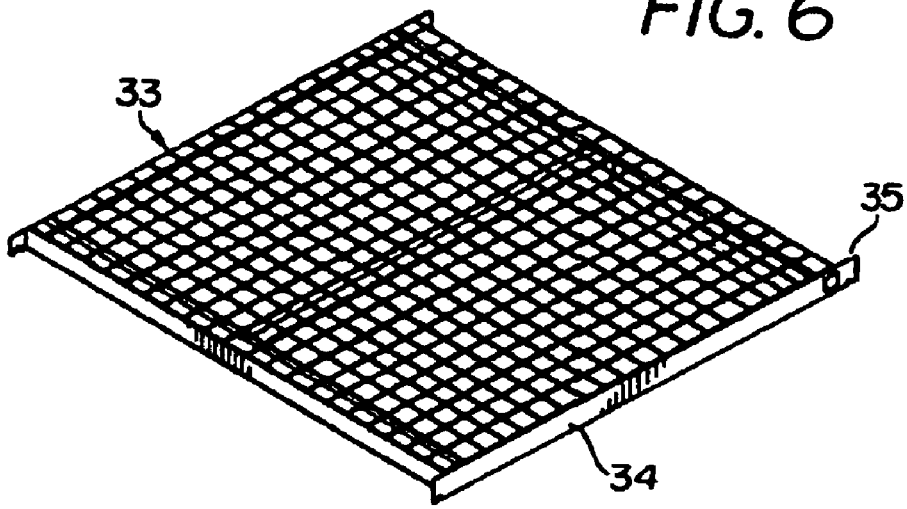
Figure 7:
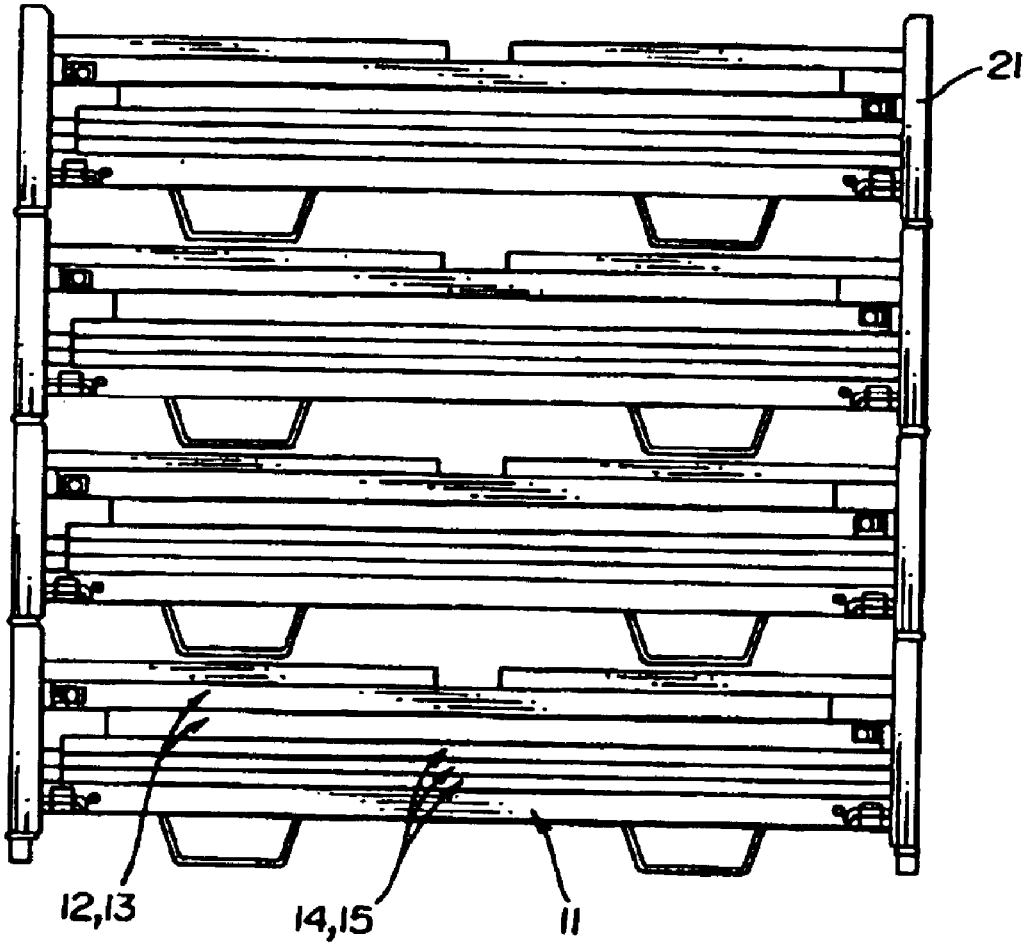

In the following the invention is further described by reference to a preferred embodiment where:

FIG. 1 illustrates a collapwsible container according to a preferred embodiment of the invention, the various parts being shown in exploded view, FIG. 2 shows a detained view of a corner of the bottom element of a container according to FIG. 1, FIG. 3 shows a perspective view of corner pillar for a container according to the invention, FIG. 4 shows a crossectional view of a sidewall element with hook-shaped elements, FIG. 5 shows a crossectional view of a supporting pillar for a partition wall, FIG. 6 shows a shelf plate for a container according to the invention in perspective view and, FIG. 7 shows a stack of four containers according to the subject invention in their empty condition.

FIG. 1 shows a collapsible container according to the invention, with a bottom element 11, two gable walls 12 and 13 and two side walls 14 and 15 which each consists of three elements 14 A–C and 15 A–C. The side wall 15 and its elements 15 A–C are not shown in FIG. 1. At the middle of each side edge of the bottom element 11 is mounted a supporting pillar 16 and 17 for a partition wall 36 and for shelves to be further described below.

The bottom element 11 is designed with longitudinal girders 18, traversal girders 19 at the ends and supporting paws 20 which provide an aperture for a forktruck. The dimensions of the bottom element may be, for example, 210×100 cm, however, other dimensions may be used according to a convenient regulation. In practice such containers are dimensioned to fit conveniently with other transportation equipment, e.g. within larger freight containers, lorries and planes.

At each corner is arranged an extending support furnishing 21 in the shape of an angular guide (FIG. 2) which provides room and support for the lower part 23 of a supporting pillar 22. FIG. 3 shows a free supporting pillar 22. The supporting pillars 22 are integrated with the gable wall, and are manufactured with a substantially tubeshaped rectangular crossection, with a longitudinally arranged split-shaped recess 24. At the midpoint of the supporting pillars 22 is arranged slit openings 52 for attachment of the sidewall elements. The gable walls 12 and 13, like the other wall elements, are covered by a netting to prevent unwanted removal of goods stored within the container.

The sidewall elements 14 A–C and 15 A–C are manufactured as modules with rectangular frame tubes 26 and wire grids 27. At each end, adjacent to the corners, are arranged two extending hooks 28, 29 of a plastic material (FIG. 4) with a notch 30 for engagement with slit openings 31 in the supporting pillars 16, 17, 22. The notches 30 are arranged closer to the free end of the hooks 28, 29 than to the ends attached to the frame tubing 26, so that they may be disengaged from the slit openings by sideways displacement. The depth of the notches 30 must be larger than the distance B between two side elements adjacent to each other. This will prevent a side element from being removed without first removing the element above.

The supporting pillars 16, 17 have slit openings for attachment of shelves 33 as shown in FIG. 5. The shelves 33 have flanges 34 projecting on opposite sides, which at its ends are extended to hook-shaped elements 35 for attachment. Regarding the positioning of the notches, the same applies here as described above.

The container according to FIG. 1 has a partition wall 36 and a shelf 37, 38 mounted on each side of the partition wall. The partition wall 36 is attached between the supporting pillars 16, 17, which are disengagably attached to the bottom element. In addition to the attachment openings 39, 40 at the centre, there are two further pairs of attachment openings, 41, 42 and 43, 44, arranged centrally on each half of the bottom element. It is thus possible to position up to three partition walls or one or two partition walls into three different positions. At a midpoint of the short ends of the bottom element 11, attachment furnishings 45 are arranged for similar supporting pillars (FIG. 2). Such a furnishing may also be arranged (not shown) centrally on the bottom element. In FIG. 2 the bottom element is shown without a wire grid bottom.

FIG. 5 shows a supporting pillar 16 for a partition wall. It has a central U-shaped profile with a flange 46 on each side. Along the bottom of the U-profile slit openings 47 are arranged for attachment of the partition wall 36, while along both flanges, a series of slit openings 48 for shelves 37, 38 are arranged in arbitrary positions determined by the dividing of the series of slit openings.

The side wall elements are designed with a width, i.e. a height extent in a mounted condition, which is one half of the width of the bottom element. This means that the space is optimally utilized when returning and storing empty containers. FIG. 7 shows how four containers according to the invention may be stacked in their empty condition. This gives an optimal utilization of the space available, and allows four empty containers to be transported with the same transporting means and within the same space demand as one single erected container.

Another advantage with this container design is that all elements can be lifted and positioned into place or disengaged by one person alone. This means greater versatility during handling, since two people are not required. This again means that the time for assembly and the personnel costs involved with the use of the container according to that of the invention, is significantly reduced compared to that of previously known containers.

It is advantageous that the corner posts are disengagably attached to the bottom element, for example with disengagable bolts 51 which can withstand the weight of the container. In this way, the container can be lifted with equipment that is arranged to engage with hooks or the like in the upper region of the gable walls. In addition there may be formed a slit opening 50 (FIG. 2) in a flange 49 of the upwards extending support furnishing 21, for receiving a protruding hook-shaped part of a side element. This gives an automatic locking between the bottom element and side element which allows lifting of the assembled container.

The container according to the invention is assembled in a way that locks the different parts together mutually. With an appropriate lock that blocks lifting of the uppermost sidewall elements, the entire structure will be locked against opening.

What is claimed is:

1. [Collapsible] *A collapsible* container comprising*:*

*two opposite gable walls having corner supporting pillars;* a bottom element [(11)] with [openings (21)] *extending supporting furnishings* at the corners for disengagable attachment of *the* two opposite gable walls [(12, 13),]*;*

*a plurality of longitudinally arranged sidewall elements;* wherein the [gable walls are connected to or are associated with] *corner* supporting pillars [(24) which] are provided with slit-shaped openings [(31)] for disengagable mounting of *the* longitudinally arranged sidewall elements [(14, 15)]*;*

[which have] projecting hooks [(28, 29)] with notches [(30)] *in the sidewall elements* for engagement with the slit-shaped openings[, and] *of the corner supporting pillars;* wherein *attachment* openings [(39–44)] are arranged in the bottom element [(11)] for disengagable attachment of a transversal partition wall [(36), characterised in that]*;*

*wherein* the sidewall elements [(14, 15)] each have a height dimension [(A)] which is [substantially] *about* one half of the width of the bottom element [(11),]*;* the *vertical* distance [(B)] between [two] *the top of a lower* sidewall element[s (14, 15)] *and the bottom of an adjacent upper sidewall element* is less than the depth of the notch [(30)] in the hooks [(28, 29)], *whereby the lower sidewall is prevented from being removed without first removing the upper sidewall element;* the corner [posts (22)] *supporting pillars* of the gable walls [(12, 13) are manufactured with a tubular profile with] *have* attachment slit-shaped openings facing inwards, for attachment of shelves [(33),]*;* and the container includes *side* supporting pillars [or side posts (16, 17)] with a projecting flange in both sideward directions, said flanges being provided with slit-shaped openings [31] for attachment of shelves [(33)].

2. [Container] *The container* according to claim 1[, characterised in that] *wherein* the *side and corner* supporting pillars [(16, 17, 22)] have attachment slit openings at an upper end for arrangement of shelves [(33)] constituting covering elements [(lids)].

3. [Container] *The container* according to claim 2 [characterised in that] *wherein* the bottom element [(11) has] attachment openings [(39–44) for] *accommodate* supporting pillars for transversal partition walls for the partitioning of the container into four sections.

4. [Container] *The container* according to claim 2 [characterised in that] *wherein* each partition wall comprises two *side and* support*ing* pillars [(16, 17)] and a wall element [(36) which can be attached to these].

5. [Container] *The container* according to claim 2 [characterised in that] *wherein* the total collapsed height of the container is one quarter of its height as erected.

6. [Container] *The container* according to claim 2 [characterised in that] *wherein* the gable walls are disengagably attached to the bottom element in such a way that the weight can be transferred to the gable walls.

7. [Container] *The container* according to claim 1[, characterised in that] *wherein* the bottom element [(11) has] attachment openings [(39–44) for] *accommodate* supporting pillars for transversal partition walls for the partitioning of the container into four sections.

8. [Container] *The container* according to claim 7 [characterised in that] *wherein* each partition wall comprises two *side* support*ing* pillars [(16, 17)] and a wall element [(36) which can be attached to these].

9. [Container] *The container* according to claim 7 [characterised in that] *wherein* the total collapsed height of the container is one quarter of its height as erected.

10. [Container] *The container* according to claim 7 [characterised in that] *wherein* the gable walls are disengagably attached to the bottom element in such a way that the weight can be transferred to the gable walls.

11. [Container] *The container* according to claim 1[, characterised in that] *wherein* each partition wall comprises [of] two *side* support*ing* pillars [(16, 17)] and a wall element [(36) which can be attached to these].

12. [Container] *The container* according to claim 11 [characterised in that] *wherein* the total collapsed height of the container is one quarter of its height as erected.

13. [Container] *The container* according to claim 11 [characterised in that] *wherein* the gable walls are disengagably attached to the bottom element in such a way that the weight can be transferred to the gable walls.

14. [Container] *The container* according to claim 1[, characterised in that] *wherein* the total collapsed height of the container is one quarter of its height as erected.

15. [Container] *The container* according to claim 14[, characterised in that a] *wherein the extending* support furnishing [(21)] at each corner of the bottom element [(11)] provides support for an empty container to be stacked.

16. [Container] *The container* according to claim 15 [characterised in that] *wherein* the gable walls are disengagably attached to the bottom element in such a way that the weight can be transferred to the gable walls.

17. [Container] *The container* according to claim 14 [characterised in that] *wherein* the gable walls are disengagably attached to the bottom element in such a way that the weight can be transferred to the gable walls.

18. [Container] *The container* according to claim 1[, characterised in that] *wherein* the gable walls are disengagably attached to the bottom element in such a way that the weight can be transferred to the gable walls.

19. [Container] *The container* according to claim 18[, characterised in that] *wherein* the sidewall elements engage with [elements (23) which project up from the bottom element] *the extending support furnishings*, so that the corner [posts (24)] *supporting pillars* become locked to the bottom element.

*20. A collapsible container comprising:*

*two opposite gable walls having corner supporting pillars;*

*a bottom element with extending support furnishings at the corners for disengagable attachment of the two opposite gable walls;*

*a plurality of longitudinally arranged sidewall elements;*

*wherein the corner supporting pillars are provided with slit-shaped openings for disengagable mounting of the sidewall elements;*

*projecting hooks with notches in the sidewall elements for engagement with the slit-shaped openings of the corner supporting pillars;*

*a transversal partition wall;*

*wherein attachment openings are arranged in the bottom element for disengagable attachment of the transversal partition wall;*

*wherein the sidewall elements each have a height dimension which is about one half of the width of the bottom element;*

*the vertical distance between the top of a lower sidewall element and the bottom of an upper sidewall element is less than the depth of the notch in the hooks, whereby the lower sidewall is prevented from being removed without first removing the upper sidewall element;*

*one or more shelves;*

*wherein the corner supporting pillars of the gable walls have attachment slit-shaped openings facing inwards, for attachment of the shelves; and*

*the container includes side supporting pillars with a projecting flange in both sideward directions, said flanges being provided with slit-shaped openings for attachment of the shelves.*

* * * * *